W. F. HARRSCH.
Distance-Measuring Instrument.
No. 160,823.　　　　Fig. 1.　　　　Patented March 16, 1875.
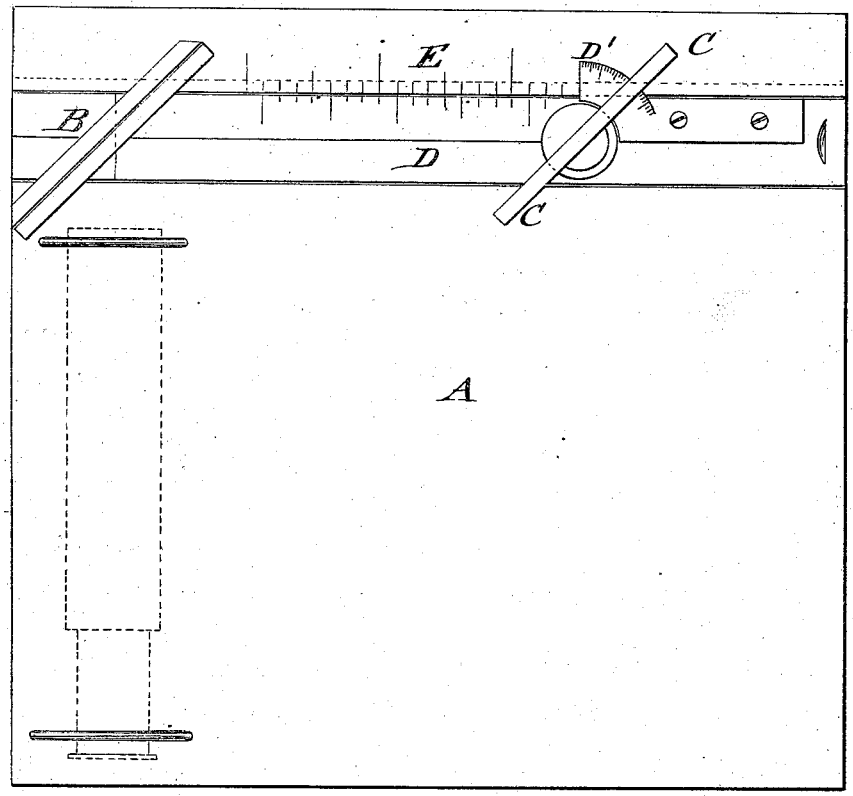
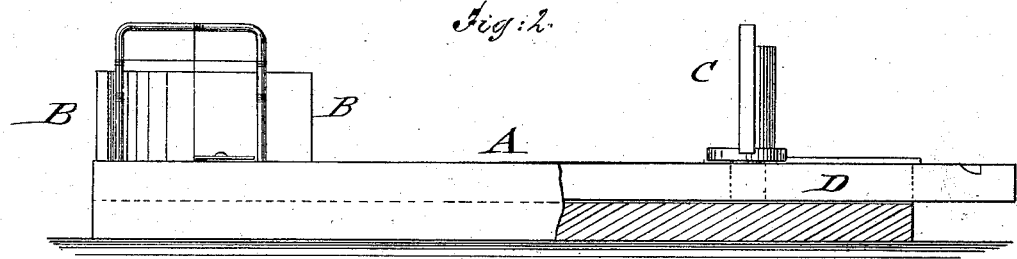
Fig. 2.
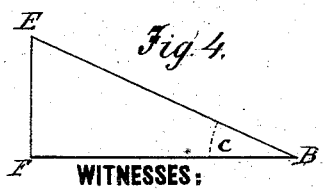
Fig. 4.
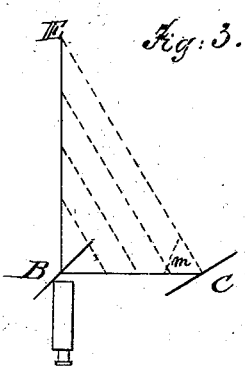
Fig. 3.
WITNESSES:
Chas. Nida
A. F. Terry
INVENTOR:
Wm. F. Harrsch
BY
ATTORNEYS.

UNITED STATES PATENT OFFICE.

WILLIAM F. HARRSCH, OF CHICAGO, ILLINOIS.

IMPROVEMENT IN DISTANCE-MEASURING INSTRUMENTS.

Specification forming part of Letters Patent No. 160,823, dated March 16, 1875; application filed November 30, 1874.

*To all whom it may concern:*

Be it known that I, WILLIAM F. HARRSCH, of Chicago, in the county of Cook and State of Illinois, have invented a new and Improved Instrument for Measuring Distances, of which the following is a specification:

In the accompanying drawing, Figure 1 represents a top view of my improved instrument for measuring distances; Fig. 2, a side elevation of the same.

Similar letters of reference indicate corresponding parts.

My invention relates to an instrument for measuring distances by very simple devices, which may be either mounted separately on a tripod or used as an attachment to a transit-compass or similar instrument, forming a valuable means for engineers, surveyors, and others to ascertain distances with accuracy, which, by the nature of the ground, could only be determined with considerable difficulty and loss of time. The invention consists of two reflectors, of which one is placed stationary on a suitable frame under an angle of forty-five degrees, in front of the object-glass of the telescope, extending to the height of the center line of the same, while the other pivoted reflector is mounted on a sliding piece, which moves under suitable angle to the line of sight along a scale on which the distance is indicated by a pointer of the pivoted reflector at the point where the reflected picture and the real object, seen by the upper half of the telescope above the stationary reflector, fall exactly into one.

In the drawing, A represents a frame of suitable light construction for supporting the operating parts of the measuring-instrument, which frame may either be mounted on a tripod, forming a separate instrument, or, by preference, be attached by suitable clamps to some telescope-instrument for the purpose of being readily brought into use when required. A stationary reflector, B, is secured by suitable set-screws in front of the object-glass of a telescope at an angle of forty-five degrees to the line of sight of the same, being of such a height that its upper edge rises to the center line of the telescope, covering the lower half of the same, but admitting the direct use of the upper half of the telescope. A second reflector, C, is pivoted on a slide-piece, D, which is arranged by preference under right angles to the line of sight from its intersection with the stationary reflector B. The slide-piece may, however, be arranged under any other angle to the line of sight, if an angle more favorable to the reflectors be found; but, in general, the right angle is, on account of its giving the greatest distance within a certain compass, more advantageous. The slide-piece D runs along an equally-divided scale, E, of frame A, and indicates by a pointer, D', at right angles with the slide-piece the distance of the object on the scale after the pivoted reflector is set to the proper proportion. The center of the pivot or reflector C, and the intersection of line of sight with reflector B, are required to fall in the center line of the slide-piece. The reflectors may be of glass, metal, or other material, as deemed best, and are raised and lowered with the frame above or below the level, as required by the objects. The reflectors are secured under right angles to the frame by suitable set-screws.

The instrument is used in the following manner: The telescope is directed to the object whose distance is to be measured, and the sliding reflector is then moved sidewise until the object appears in the stationary reflector and falls exactly in line with the upper part, (seen through the telescope,) when the distance is read off by the position of the pointer on the scale. The pivoted reflector C is brought into its proper position by placing the instrument at an accurately-measured distance from the object and bringing the pointer to the same figure on the scale, turning, then, the reflector C until the object appears in the reflector B in line with its part seen directly through the telescope. The pivoted reflector is then firmly clamped in position, and the instrument ready for use. Different scales may be used, the pivoted reflector being readily set to any one, but care should be taken that the scale is neither too large nor too small.

The geometrical principle of the invention is illustrated by the diagrams represented in Figs. 3 and 4. If, in a triangle, B C E, (see Fig. 3,) one side, B C, is divided into equal parts, and through the same lines drawn parallel with the other side C E, the third side B E will be divided in just as many equal parts. After the manner already described to bring reflector C in working order, the reflecting-angle $m$ is obtained, and, so to speak, moved by the slide, it will draw the parallels B C, representing the scale, and B E the distance. For measuring distance on an inclined plane, where the instrument will be most valuable, let B E, Fig. 4, represent the distance, and $c$ angle of elevation obtained by instrument. B E is radius, angle $c$ the sinus angle, and, by these two, the sinus E F, cosinus F B are easily obtained. In other words, the distance B E on the inclined plane is reduced to what the surveyor wants, viz., the horizontal distance and the perpendicular height.

Having thus described my invention, I claim as new and desire to secure by Letters Patent—

The combination, with a telescope, of a reflector, B, placed at an angle of forty-five degrees thereto, and a reflector, C, adjustably pivoted in relation to reflector B, and provided with the index D', and mounted on the graduated sliding piece D, substantially as and for the purpose described.

WILLIAM F. HARRSCH.

Witnesses:
L. H. BOLDERNOECK,
W. C. DEAKMAN.